US012619683B2

(12) United States Patent
Abolhasssani et al.

(10) Patent No.: US 12,619,683 B2
(45) Date of Patent: May 5, 2026

(54) ARTIFICIAL INTELLIGENCE (AI) BASED DATA MATCHING AND ALIGNMENT

(71) Applicant: ACCENTURE GLOBAL SOLUTIONS LIMITED, Dublin (IE)

(72) Inventors: Neda Abolhasssani, San Mateo, CA (US); Maziyar Baran Pouyan, Emeryville, CA (US); Teresa Sheausan Tung, Tustin, CA (US); Andrew Fano, Lincolnshire, IL (US); Sayantan Mitra, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1289 days.

(21) Appl. No.: 17/411,410

(22) Filed: Aug. 25, 2021

(65) Prior Publication Data

US 2022/0358336 A1 Nov. 10, 2022

(30) Foreign Application Priority Data

May 4, 2021 (IN) ............................. 202111020371

(51) Int. Cl.
| | |
|---|---|
| *G06F 18/2413* | (2023.01) |
| *G06F 40/30* | (2020.01) |
| *G06N 5/02* | (2023.01) |

(52) U.S. Cl.
CPC .. *G06F 18/24147* (2023.01); *G06F 18/24143* (2023.01); *G06F 40/30* (2020.01); *G06N 5/02* (2013.01)

(58) Field of Classification Search
CPC ......... G06F 18/24147; G06F 18/24143; G06F 40/30; G06N 5/02
See application file for complete search history.

(56) References Cited

U.S. PATENT DOCUMENTS

| | | | | |
|---|---|---|---|---|
| 9,436,760 | B1 * | 9/2016 | Tacchi | ................ G06F 16/9024 |
| 2006/0058624 | A1 * | 3/2006 | Kimura | .................. A61B 5/055 |
| | | | | 600/407 |
| 2007/0203908 | A1 * | 8/2007 | Wang | .................. G06F 16/3331 |
| | | | | 707/E17.069 |

(Continued)

OTHER PUBLICATIONS

Kayva Chandra, "Classify your data using Azure Purview", Dec. 9, 2020, (5 pages).

(Continued)

*Primary Examiner* — Shahid K Khan
(74) *Attorney, Agent, or Firm* — Mannava & Kang, P.C.

(57) ABSTRACT

An Artificial Intelligence (AI)-based data matching and alignment system identifies similar data sources for a target data source from a data corpus and generates a knowledge graph that enables downstream applications seamless access to data in the data corpus. The system extracts column features at different levels for the target data source and a plurality of data sources from the data corpus. Feature matrices are built from the features of the target data source and the plurality of data sources. Candidate data sources similar to the target data source are filtered from the plurality of data sources using the feature matrices. The tree-based similarity is estimated and K Nearest Neighbor (KNN) graphs are built to identify columns from the candidate data sources that are similar to columns of the target data source to build the knowledge graph.

17 Claims, 11 Drawing Sheets

(56) References Cited

U.S. PATENT DOCUMENTS

| | | | |
|---|---|---|---|
| 2011/0246466 A1* | 10/2011 | Ekin | G06F 16/532 |
| | | | 707/E17.069 |
| 2012/0254143 A1* | 10/2012 | Varma | G06F 40/30 |
| | | | 707/706 |
| 2013/0013291 A1* | 1/2013 | Bullock | G06F 40/30 |
| | | | 704/9 |
| 2015/0169758 A1 | 6/2015 | Assom et al. | |
| 2015/0178272 A1* | 6/2015 | Geigel | G06F 40/30 |
| | | | 704/9 |
| 2017/0221240 A1 | 8/2017 | Stetson et al. | |
| 2018/0101800 A1* | 4/2018 | Lecue | G06Q 10/06311 |
| 2019/0278777 A1* | 9/2019 | Malik | G06F 16/9024 |
| 2019/0278850 A1* | 9/2019 | Atasu | G06F 16/3347 |
| 2019/0384571 A1* | 12/2019 | Oberbreckling | G06F 16/25 |
| 2021/0192364 A1* | 6/2021 | Wang | G06N 5/022 |
| 2022/0269936 A1* | 8/2022 | Zhu | G06N 3/04 |

OTHER PUBLICATIONS

"Entity Matching", https://docs.cognite.com/cdf/integration/guides/contextualization/matching.html, (6 pages).

Christos Koutras et al., "REMA: Graph Embeddings-based Relational Schema Matching", Delft University of Technology, 2020, (4 page).

\* cited by examiner

240

RECEIVE REQUEST WITH INPUT
242

PREPROCESS DATA
244

EXTRACT FEATURES
246

GENERATE FEATURE MATRICES OF THE
DATA SOURCES
248

CALCULATE A DISTANCE MEASURE FOR
THE DATA SOURCES 252

BUILD KNN GRAPHS 254

IDENTIFY CANDIDATE DATA SOURCES
BASED ON THE GRAPHS 256

END

350

360

| Col | OP1 | OP2 |
|---|---|---|
| Power | PW 0.71 | XYZ 0.66 |
| Sensor 2 | Sensor 8 0.86 | SX23 0.65 |
| Temp | TMP 0.61 | TM 0.55 |
| Sensor 1 | XX 0.95 | TMP 0.83 |

370

| Col | OP1 | OP2 |
|---|---|---|
| Power | R1,R2,R3 | R1,R5 |
| Sensor 2 | R4 | R6,R3 |
| Temp | R10,R9 | R3,R4,R8 |
| Sensor 1 | R2, R12 | R4, R9 |

Well_0_1/Log1 610

| Well UWI | Data Source | Top Depth | Base Depth | Top Shift Depth | Base Shift Depth | Create Date |
|---|---|---|---|---|---|---|
| NO 15/9-19 BT2 | STAT | 4037.0 | 4049.77 | 4037.6 | 4050.37 | 2002.05.02 10:46:52.0 |
| NO 15/9-19 BT2 | STAT | 4054.5 | 4071.8 | 4053.4 | 4070.7 | 2002.05.02 10:46:52.0 |
| NO 15/9-19 BT2 | STAT | 4037.0 | 4089.95 | 4070.6 | 4088.55 | 2002.05.02 10:46:52.0 |

Well_0_1/Log1 620

| Well UWI | Data Source | Top Depth (meters) | Base Depth (meters) | Top Shift Depth (meters) | Base Shift Depth | Create Date |
|---|---|---|---|---|---|---|
| NO 15/9-19 BT2 | STAT | 3837.0 | 3852.2 | 3838.6 | 3853.8 | 2002.05.02 10:46:52.0 |
| NO 15/9-19 BT2 | STAT | 3854.0 | 3881.45 | 3854.2 | 3881.65 | 2002.05.02 10:46:52.0 |
| NO 15/9-19 BT2 | STAT | 3881.5 | 3908.25 | 3882.1 | 3908.85 | 2002.05.02 10:46:52.0 |

*FIG. 6*

ARTIFICIAL INTELLIGENCE (AI) BASED DATA MATCHING AND ALIGNMENT

PRIORITY

The present application claims priority under 35 U.S.C. 119(a)-(d) to the Indian Provisional Patent Application Serial No. 202111020371, having a filing date of May 4, 2021, the disclosure of which is hereby incorporated by reference in its entirety.

BACKGROUND

Complex computing systems that are used today across various domains including manufacturing, energy, finance, healthcare, etc., employ numerous data sources that receive and store data in different formats. These may include structured data sources such as relational database management systems (RDBMS) or unstructured data sources such as those storing data from sensors, scanners, etc. Real-world data has therefore become increasingly complex and as a result, may be prone to errors. For example, real-world data may be incomplete as it may lack certain attributes of interest, attribute values, or contain only aggregate data. Furthermore, real-world data may be noisy and inconsistent as it may contain errors, outliers, discrepancies in codes or names, etc. Such data issues render mapping from raw data into data files a difficult technical problem where approximately 80% of the data science efforts are dedicated to preparing the data. These data preparation tasks are often carried out by data experts and data engineers who have the domain knowledge and the knowledge regarding the data sources so that the data is correctly connected to other data and labeled accurately. Such relationship processing and mapping is a time-consuming process that requires expert knowledge.

BRIEF DESCRIPTION OF DRAWINGS

Features of the present disclosure are illustrated by way of examples shown in the following figures. In the following figures, like numerals indicate like elements, in which:

FIG. 6 shows data from an example use case that can be processed by the system according to some examples disclosed herein.

DETAILED DESCRIPTION

Figure 1A:
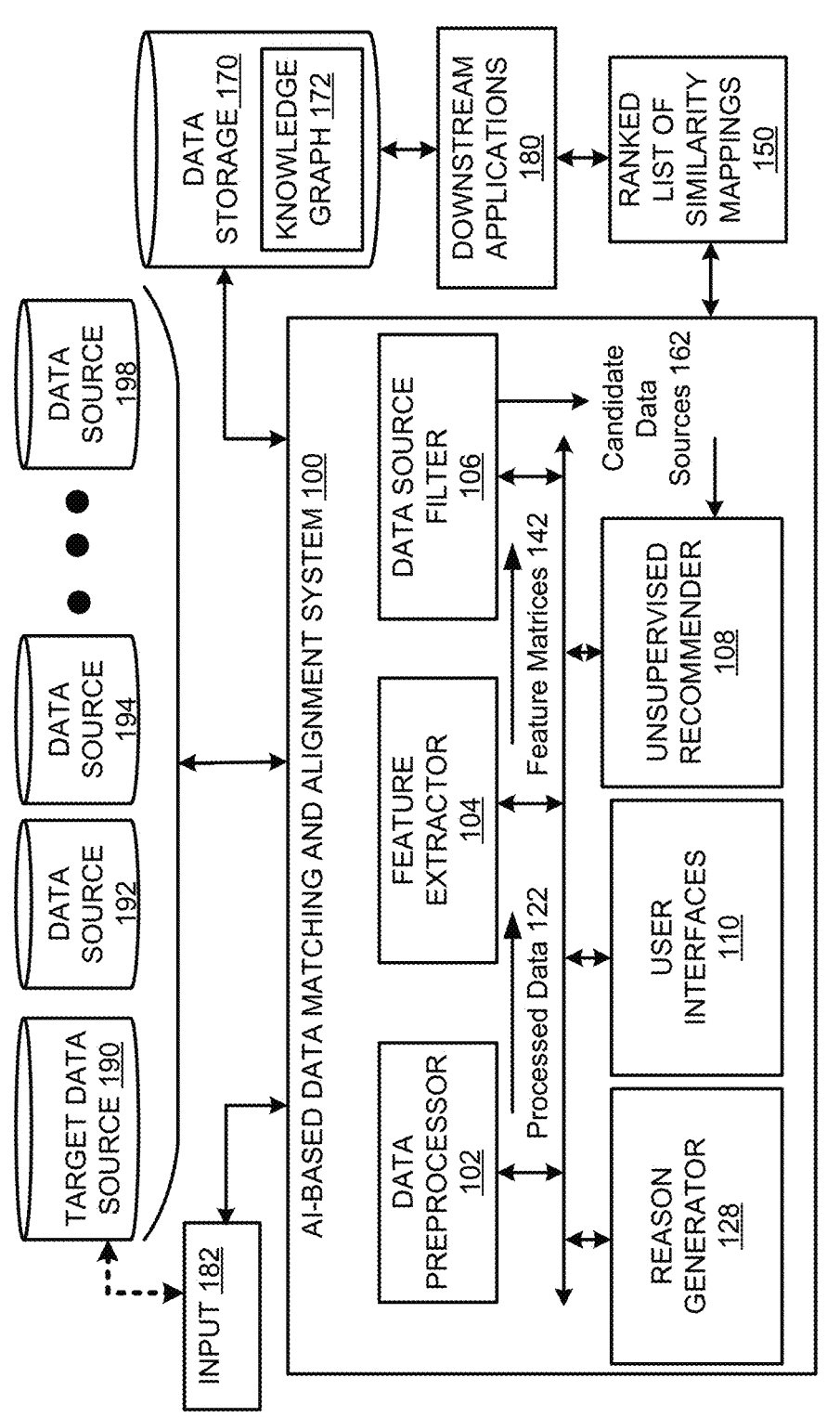
FIG. 1A shows a block diagram of an Artificial Intelligence (AI)-based data matching and alignment system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based data matching and alignment system that generates similarity mappings for a target data source from a plurality of data sources in a data corpus is disclosed. In an example, the plurality of data sources can be columnar data sources with data arranged in arrays of rows and columns, e.g., spreadsheets, database tables, database views, etc. When a request for identifying similar data sources with a reference to a target data source is received, the plurality of data sources from the data corpus are initially filtered to identify candidate data sources that are similar to the target data source. The candidate data sources are further analyzed to identify columns from the candidate data sources that are similar to the columns of the target data source. A knowledge graph representing similar columns is generated. The knowledge graph provides structured, well-defined data to downstream applications.

The plurality of data sources including the target data source can be initially preprocessed for converting the data into a uniform format, extracting the data structure, parsing, cleaning, outlier detection, deduplication, etc. Features are extracted at different levels for the columns of the plurality of data sources including the target data source. The extracted features may include but are not limited to, character level features, semantic level features, and dependency level features. Feature matrices are generated from the corresponding features for each of the plurality of data sources including the target data source. The features of each data source may be thus stored as feature matrices wherein the features are arranged column-wise by stacking the character level features, the semantic level features and the dependency level features adjacent to each other in the feature matrix.

The feature matrices are used to identify the candidate data sources and similar columns. A distance metric may be initially estimated for the feature matrices of each of the plurality of data sources with the feature matrix of the target data source. In an example, Mahanalobis distance can be used as the distance metric. Further, similarity determination techniques such as, K Nearest Neighbor (KNN) techniques may be employed on the feature matrices to determine the candidate data sources from the plurality of data sources that are similar to the target data source. The candidate data sources obtained by filtering the plurality of data sources are further analyzed for column similarity determinations.

Feature matrices of the candidate data sources and the target data source are analyzed using a tree-based similarity calculation. In an example, random forest distance (RFD) may be applied to the feature matrices of the candidate data sources and the target data source. Fused KNN graphs are further built to better identify the similar columns from the candidate data sources for the columns of the target data source. Thus, a relational graph wherein each node/vertex denotes one data object and wherein similar data objects are connected via edges is generated. A ranked list of similar mappings can be generated from the relational graph (e.g., the fused KNN graphs) showing the mappings of similar columns and the extent of similarity between the columns. In an example, the ranked list of mappings can be further represented as a knowledge graph wherein the nodes represent the columns and similar columns are connected by the graph edges. The knowledge graph provides uniformly formatted, structured data to downstream applications.

The AI-based data matching and alignment systems and methods disclosed herein provide a technical solution to the technical problem of arranging siloed data from disparate data sources into a comprehensive data structure such as a knowledge graph which enables downstream applications to gain insights and provide heretofore unavailable functionality. Industry-specific data, for example, seismic engineering data can include structured data stored in existing applications. The industry-specific data may also include unstructured data e.g., Internet of Things (IoT) data, received from various sources such as hardware in the wells, plants, etc. To be usable for analysis by different applications, the IoT data has to be processed/converted to structured data, i.e., it has to be normalized into industry-specific formats (e.g., a tag from a sensor data has to be mapped to a process) and then labeled and mapped. Existing tools that enable data mapping and data preparation may allow for syntactic data matching using string comparison functions, etc., however, they do not enable determining relationships between the data in different formats across various data sources in a data corpus. As a result, data may be duplicated or valuable insights may be lost. To a certain extent, these problems can be mitigated by domain experts who may be able to examine data and identify duplicate data or provide insights. However, this can be very laborious and time-consuming and makes sub-optimal use of the expert resources. For example, a temperature measurement along a process can happen at different points, via different tools, in different units, and at different time intervals. If this data can be accurately captured in a standard format it may help enable an expert to accurately understand the changes occurring along the process.

Disclosed herein are AI-based data matching and content alignment systems and methods that provide for data integration across unstructured or poorly structured data to be migrated into structured data thereby enabling data integration from multiple sources into a single new data source (e.g., data warehouse). Additionally, the AI-based data matching and alignment systems and methods determine relationships between data that go beyond syntactic data matching and string comparison functions. The AI-based data matching and alignment system can estimate matching data from different data sources based on the relationships determined through AI techniques described herein. Furthermore, the determined matches and relationships can be used to build the knowledge graph for the data from the plurality of data sources, which in turn can drive more efficient and accurate analytics by downstream applications.

FIG. 1A shows a block diagram of an AI-based data matching and alignment system 100 in accordance with the examples disclosed herein. The data matching and alignment system 100 receives an input 182 referring to a target data source 190, identifies data sources having similar data from a plurality of data sources 192, 194, . . . 198 and builds a knowledge graph 172 of the similar data sources. The knowledge graph 172 enables building better data-related applications that can handle different types of queries, provide insights that would be unavailable but for the knowledge graph 172, etc. In an example, the plurality of data sources 192, 194, . . . 198 may be related to a specific domain and each of the plurality of data sources 192, 194, . . . 198 including the target data source 190 may be a columnar data source with the data arranged as an array of rows and columns. Different aspects of the data matching and alignment system 100 are discussed herein with reference to examples in the energy domain, however, it may be appreciated that the application of the data matching and alignment system 100 may not be restricted to the energy domain only but may be applied to various other domains including but not limited to, financial, health care, manufacturing, retail, etc. Referring to the energy domain, the plurality of data sources 192, 194, . . . 198, including the target data source 190 may pertain to data used in the various operations of an oil company. For example, one of the plurality of data sources 192, 194, . . . 198, may include asset data such as well measurements while another data source may include other asset maintenance data. More specifically, the output of the data matching and alignment system 100 includes a ranked list 150 of similar mappings selected from the plurality of data sources 192, 194, . . . 198 for the target data source 190 which may be further encoded in the knowledge graph 172 so that other downstream applications 180 The ranked list 150 may also include reasons for the selection of the specific data sources as being similar to the target data source 190.

The data matching and alignment system 100 includes a data preprocessor 102, a feature extractor 104, a data source filter 106, and an unsupervised recommender 108 employing unsupervised machine learning functions to determine predictions of matching data. In addition, the data matching and alignment system 100 may put forth 1/O user interfaces (UIs) 110 to receive the input 182 with the reference to the target data source 190 or to provide output such as the ranked list 150. On receiving the input 182, the data preprocessor 102 accesses the plurality of data sources 192, 194, . . . 198 to preprocess the data for further analysis. The preprocessing may include but is not limited to, parsing and cleaning the data from the plurality of data sources 192, 194, . . . 198 and extraction of metadata such as date/time, address, etc. The processed data 122 is provided to the feature extractor 104.

The functioning of the feature extractor 104, the data source filter 106, and the unsupervised recommender 108 is discussed below with reference to FIGS. 1B-1D. The preprocessed data 122 is provided to the feature extractor 104 for the extraction of different features. The data matching and alignment system 100 is configured to detect data objects semantically related to the target data source 190 at different levels including but not limited to, document level/file level, column level, and attribute levels. Accordingly, features of different levels as detailed infra are extracted. The extracted features are arranged as feature matrices 142 wherein each feature matrix corresponds to one data source of the plurality of data sources 192, 194, . . . 198.

The feature matrices 142 are provided to the data source filter 106 to initially identify those data sources or data sets that are similar to the target data source 190. In an example, the data source filter 106 may implement methods such as Mahalanobis distance in conjunction with K Nearest Neighbor (KNN) to identify similar data sources or candidate data sources 162. The candidate data sources 162 are provided to the unsupervised recommender 108 for column similarity identification. The identification of the candidate data sources 162 provides for preliminary filtering so that a subset of the plurality of data sources 192, 194, . . . 198 are initially selected for deeper analysis. Therefore, further column identification and knowledge graph building processes are made more efficient since the columns of the target data source 190 need to be matched with only a subset of the plurality of data sources 192, 194, . . . 198 i.e., the candidate data sources 162 to identify similar columns thereby saving time and processing resources.

The unsupervised recommender 108 accesses the feature matrices corresponding to the candidate data sources 162 for column similarity determination. The feature space may be highly skewed which may cause the feature dependency to affect the distance calculation when implemented for column similarity determination. The unsupervised recommender 108, therefore, outputs a ranked list of similarity mappings 150. The unsupervised recommender 108 can also build a knowledge graph 172 from the similarity column mappings. The knowledge graph 172 includes nodes representing the columns and edges connecting the similar columns as determined by the unsupervised recommender. In an example, the ranked list of similarity mappings 150 may be provided to a reviewer (e.g., a domain expert) for validation, and the knowledge graph 172 may be built from validated column similarity mappings. Therefore, the expert knowledge is encoded into the knowledge graph 172 which can be reused across the downstream applications 180. The knowledge graph 172 when used with the plurality of data sources 192, 194, . . . 198, forms a knowledge graph-enabled data mesh.

In some examples, the data matching and alignment system 100 includes a reason generator 128 to generate logical explanations for matching specific columns based on the data present in the tables, thereby making it easier for the end users to understand the reasons for the matchings. The explanations can be generated by classifying the columns that are matched into multiple categories, such as but not limited to, date, object (string) and numeric types. The explanations/reasons for the date type columns can be generated based on the date ranges of the corresponding columns. For example, consider two matching date type columns, DATEPRD and DATEPRD_2 of Table 1 and Table 2 respectively. As shown below, DATEPRD_2 and DATEPRD are similar because the date range of the former is a subset of the date range of the later:

Date range of DATEPRD is 2008-02-12 00:00:00 to 2016-09-17 00:00:00

Date range of DATEPRD_2 is 2008-05-2 00:00:00 to 2014-01-22 00:00:00

For object (string) type matching columns, the semantic matches are initially identified between the data present in the matching columns and the explanations/reasons are generated based on the semantic matches. For example, two columns WELL_KIND and WELL_KIND2 of Table 1 and Table 2 respectively having binary values represented as ['True', 'False'] and ['Yes', No'] respectively can be identified as matching columns due to the mappings between the binary values as shown below:

True→Yes

False→No.

Lastly, if the matching columns are of numeric type, the explanations can be generated by showing that the distance between the distributions of the two columns is minimum as compared to other non-matching, numeric columns. The Kolmogorov-Smimov test may be used for determining the distance between the columns. For example, NPD_FACILITY and NPD_FACILITY_CODE_2 may be matched from Tables 1 and 2 respectively and the explanation/reason may be provided by the reason generator 128 as shown below:

Distribution distance between NPD_FACILITY_CODE and NPD_FACILITY_CODE_2 is 0.0.

Figure 1B:
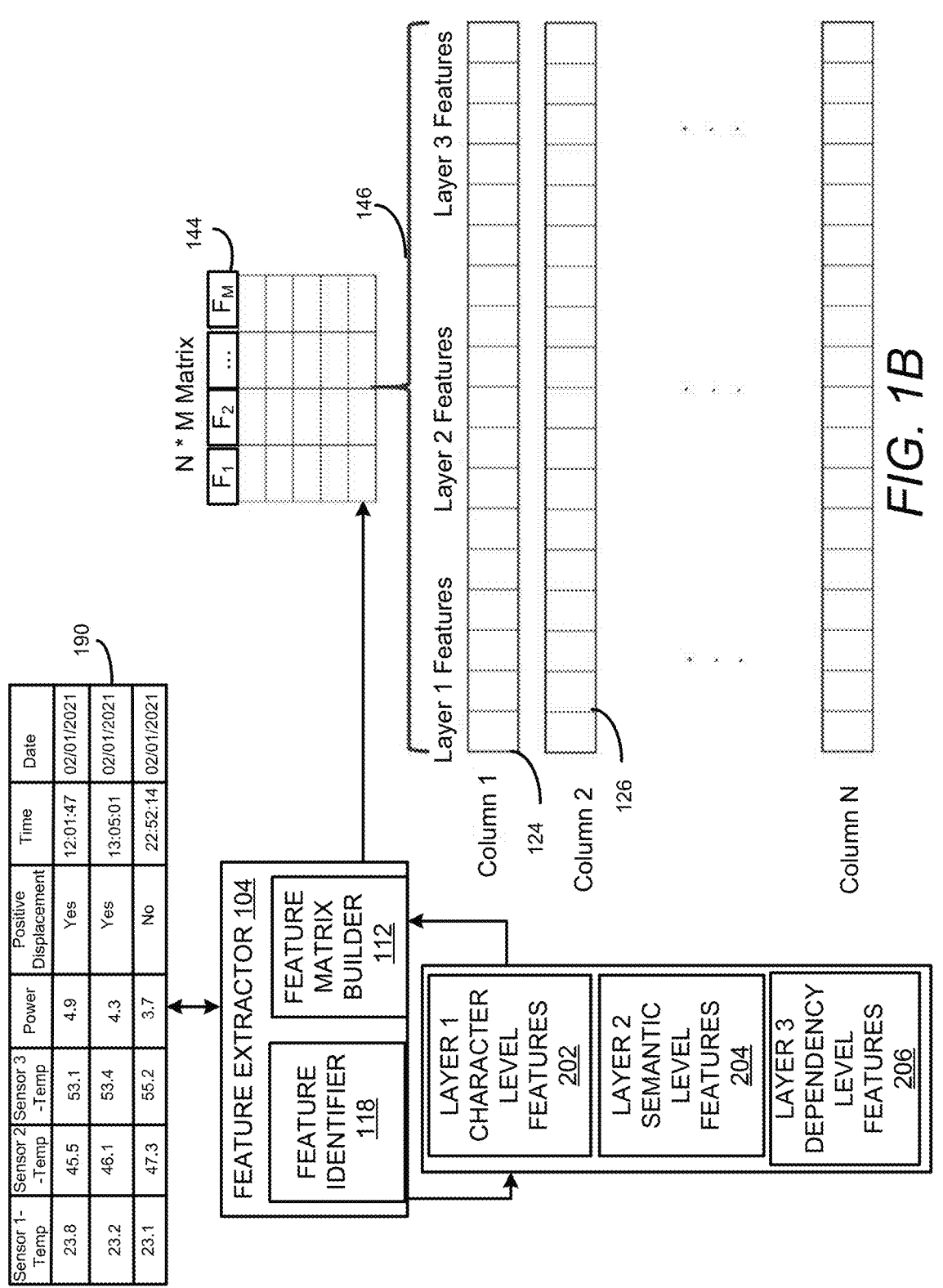
FIG. 1B shows the generation of feature matrices in accordance with the examples disclosed herein.

FIG. 1B shows the generation of the feature matrices in accordance with the examples disclosed herein. The feature extractor 104 accesses the target data source 190, and the plurality of data sources 192, . . . , 198, which are to be analyzed for similarity to the target data source 190 to extract features of these data sources. The feature extractor 104 includes a feature identifier 118 that extracts the features of each of the data sources 190, 192, . . . , 198, at three different layers. Layer 1 features can include character level features 202, such as but not limited to, column data type features, character distribution features, and the general characteristic features. Layer 2 features can include semantic level features 204, such as but not limited to, semantic text features, numeric distribution comparison features, etc. while layer 3 features can include dependency level features 206, e.g., data dependency features. Techniques such as but not limited to, Principal Component Analysis (PCA), Linear Discriminant Analysis (LDA), Bidirectional Encoder Representations from Transformers (BERT), Anderson-Darling methods can be implemented for the feature extraction at different levels.

In an example, the feature extractor 104 may also include a feature matrix builder 112. The extracted features may be used to build feature matrices for the data sources 190, 192, . . . , 198. For example, if the target data source 190 includes N columns and M features, namely, $F_1, F_2, \ldots, F_M$, are the features, then the feature matrix builder 112 builds a N*M feature matrix 144. In an example, the features of different layers may be arranged in the feature matrix 144 sequentially adjacent to each other as shown in the matrix representation 146. In an example, the features may be arranged in N rows wherein each row corresponds to features of one of the columns of the data source. Accordingly, the first row 124 of the feature matrix 144 may correspond to feature values of Column 1 of the data source, the second row 126 of the feature matrix 144 may correspond to Column 2, . . . etc. Within each row, the feature matrix builder 112 can be further configured to arrange the features so that layer 1 features 202 of a column are initially arranged followed by layer 2 and layer 3 features so that features of different layers are stacked adjacent to each other. In an example, the feature matrix builder 112 may be configured to generate a feature matrix of predetermined dimensions so that if the data source has fewer columns, the corresponding rows may be padded with some default values, e.g., zero.

Figure 1C:
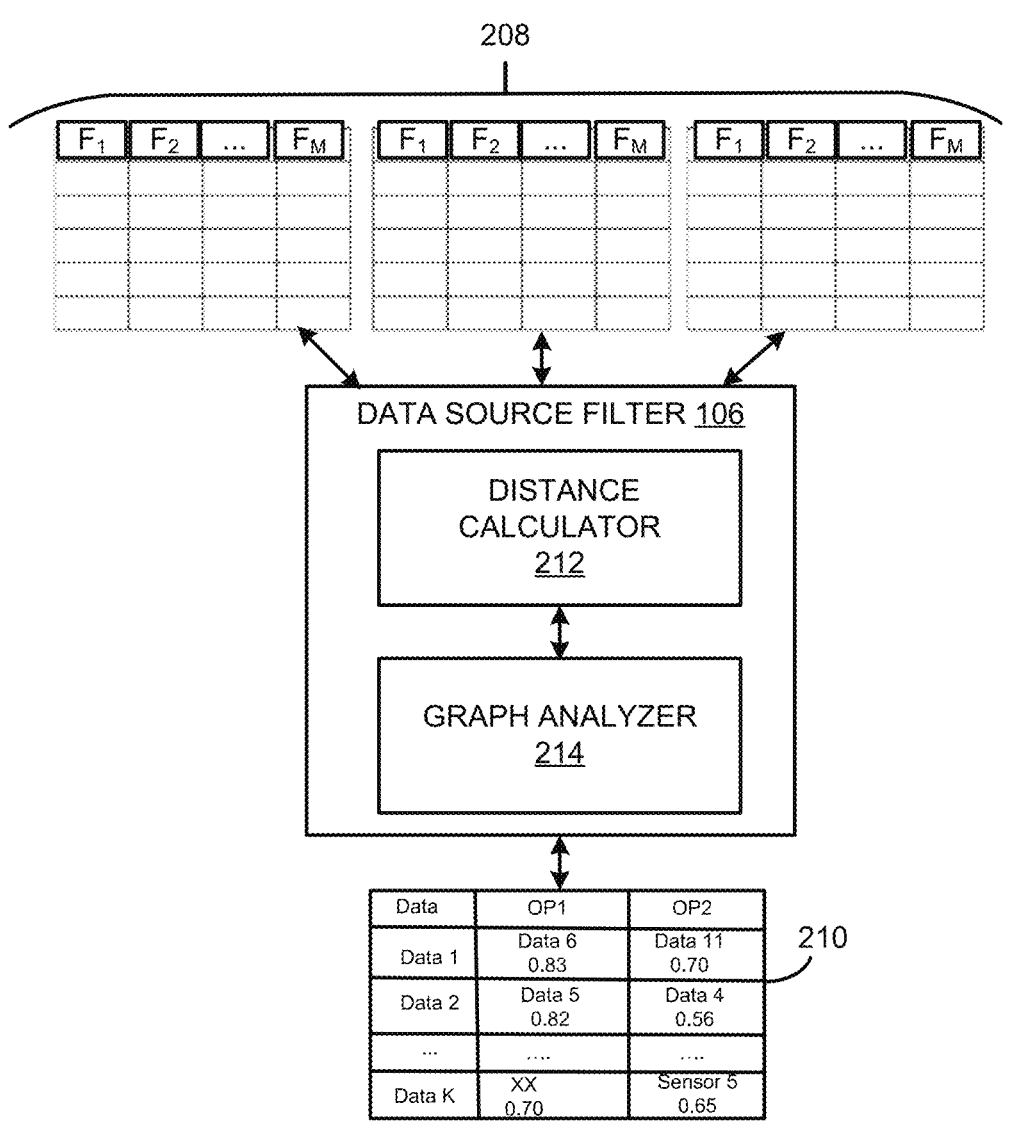
FIG. 1C shows a block diagram of a data source filter according to the examples disclosed herein.

FIG. 1C shows a block diagram of the data source filter 106 according to the examples disclosed herein. The data source filter 106 accesses the feature matrices 208 of the different data sources 190, 192, . . . , 198, and employs unsupervised machine learning functions for identifying candidate table matches or candidate data sources for the target table 190. In an example, the data source filter can include a distance calculator 212 and a graph analyzer 214. The distance calculator 212 analyzes the feature matrices

208 of the plurality of data sources 192, 194, . . . 198, by applying distance techniques such as but not limited to, Mahanalobis distance to identify data sources that are similar to the target data source 190. For example, Mahanalobis distances may be obtained for the target data source 190 with each of the plurality of data sources 192, 194, . . . 198, using the corresponding feature matrices. The distances may be communicated to the graph analyzer 214 which may apply techniques such as but not limited to, KNN to identify the closest data sources of the target data source 190 as the candidate data sources 162.

An example of the output generated by the data source filter 106 is shown in table 210 wherein candidate data sets, Data 6 and Data 11, are identified as being similar with 83% and 70% respectively for Data 1 which represents the target data set. Similarly, data sets may also be identified for a plurality of target data sources in parallel by the data matching and alignment system 100 so that similar data sets are identified for each of Data 2, . . . Data K, etc., and are listed out with the corresponding probabilities. In an example, top N data sources (wherein N is a natural number) may be selected as the candidate data sources for a given data source. The candidate data sources 162 identified by the data source filter 106 are processed for column similarity to generate specific column similarity mappings by the unsupervised recommender 108.

Figure 1D:
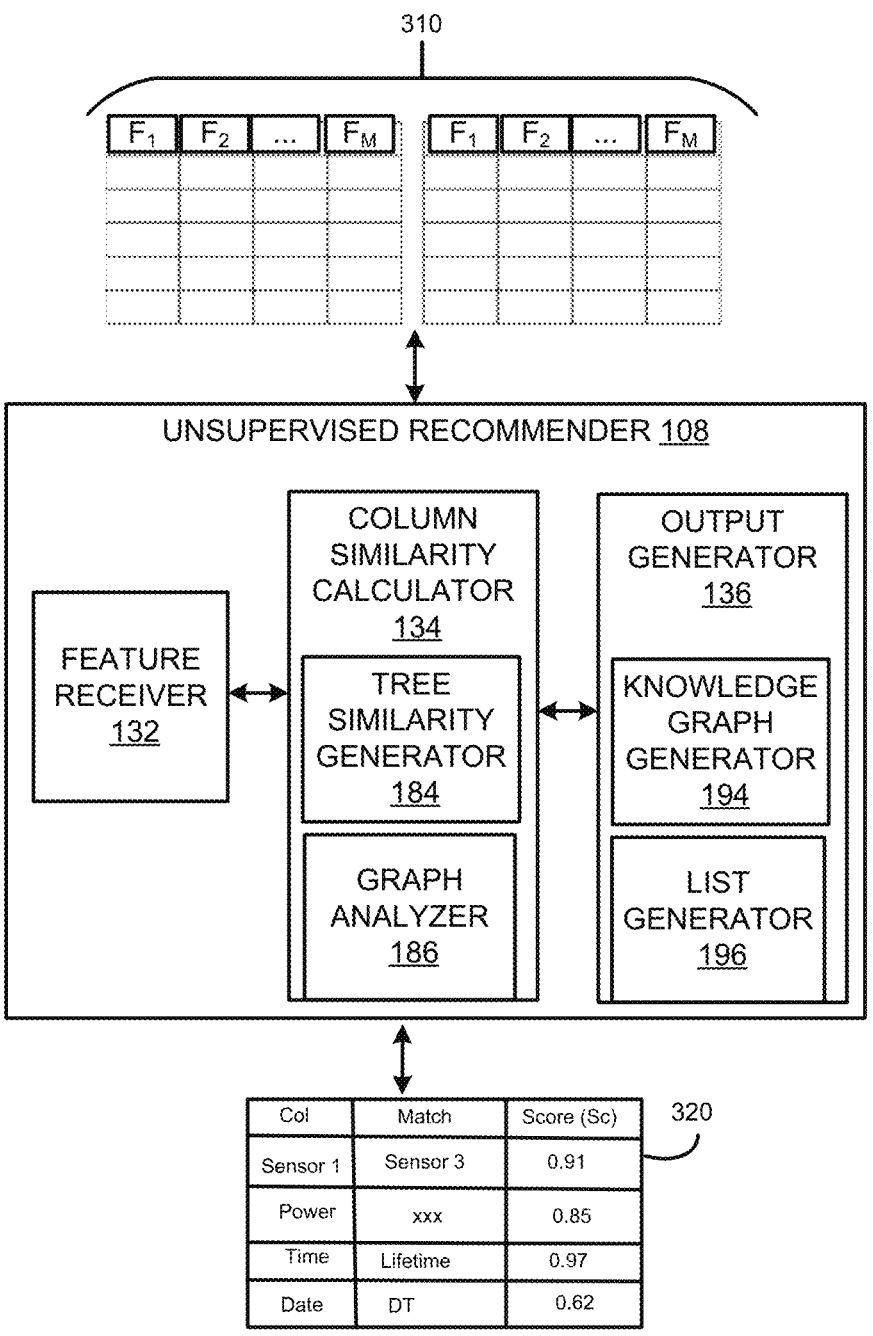
FIG. 1D shows a block diagram of an unsupervised recommender in accordance with the examples disclosed herein.

FIG. 1D shows a block diagram of the unsupervised recommender 108 in accordance with the examples disclosed herein. The unsupervised recommender 108 includes a feature receiver 132, a column similarity calculator 134, and an output generator 136. The feature receiver 132 receives a subset of feature matrices 310 of the candidate data sources 162 that are output by the data source filter 106. The column similarity calculator 134 analyzes the subset of feature matrices 310 in terms of columns. The subset of feature matrices 310 including features of the target data source 190 and the candidate data source 162 is provided to the column similarity calculator 134. In an example, the column similarity calculator 134 can implement tree-based similarity techniques such as but not limited to, a random forest distance (RFD) metric for the column similarity calculation. In an example, the similarity calculation can use the feature information about the columns in the target data source 190 and the candidate data source(s) to construct a collection of decision trees i.e., a random forest where each tree/graph represents a specific column with nodes representing the column features. The resulting forest is used to determine a distance measure such as the RFD, between the columns in the target data source 190 and the candidate data source 332.

The RFD measure is used by the graph analyzer 186 that can implement a classification algorithm (such as the fused K Nearest Neighbor (KNN)) to classify column pairs as being similar to each other or dissimilar to each other. The column pairs that were analyzed and similarities that were obtained are provided to the output generator 136. A column similarity output 320 may be generated showing the columns of the target data source 190, the columns of the candidate data sources 190 determined to be similar to the target data source 190, and the scores. For example, a target column labeled Sensor 1 has another column labeled Sensor 3 identified as being similar with a match score of 91%. Other similar columns are identified for Power, Time, Date target columns with the corresponding match scores.

Figure 2A:
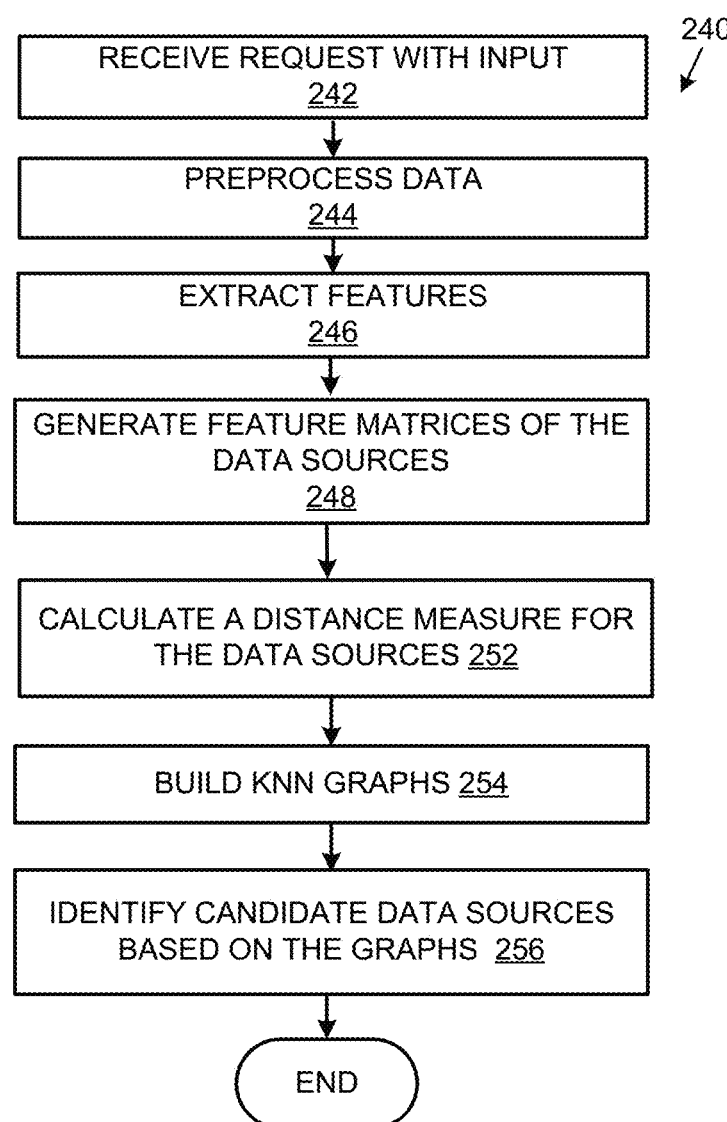
FIG. 2A includes a flowchart for a process of filtering data sources to identify the candidate data sources in accordance with the examples disclosed herein.

FIG. 2A includes a flowchart 240 for a process of filtering data sources to identify the candidate data sources for further column analysis according to the examples disclosed herein.

The method begins at 242 wherein a request for similar data identification within a data corpus is received. The request may have been generated manually by a user or automatically by another process. In either case, the request includes the input 182 which can further include the target data source 190 from the data corpus or at least a reference or a link that enables the data matching and alignment system 100 to identify and retrieve the target data source 190. At 244, data from the target data source 190 and the plurality of data sources 192, 194, . . . 198 is preprocessed for data structure extraction, parsing, cleansing, etc. At 246, features of the columns from the target data source 190 and the plurality of data sources 192, 194, . . . 198 are extracted. As mentioned above, the features of three different layers including character level features, semantic features, and dependency features are extracted.

At 248, the feature matrices 142 including the features of each data source of the plurality of data sources 192, 194, . . . 198, including the target data source 190 are generated. A distance measure is calculated at 252 between the feature matrices of each of the data sources 192, 194, . . . 198, and the target data source 190. In an example, the Mahanalobis distance technique can be used to measure the distance between the feature matrices of the data sources. At 254, the KNN technique can be applied to identify the nearest neighbors or the most similar data sets or the candidate data sources 162 for the target data source 190. Based on the KNN graphs, candidate data sources that are sufficiently similar to the target data source 190 can be shortlisted for further column similarity analysis at 256. The filtering of the data sources saves time and processing power for the data matching and alignment system 100 as it mitigates the need to test each data source from the plurality of data sources 192, 194, . . . 198 for column similarity.

Figure 2B:
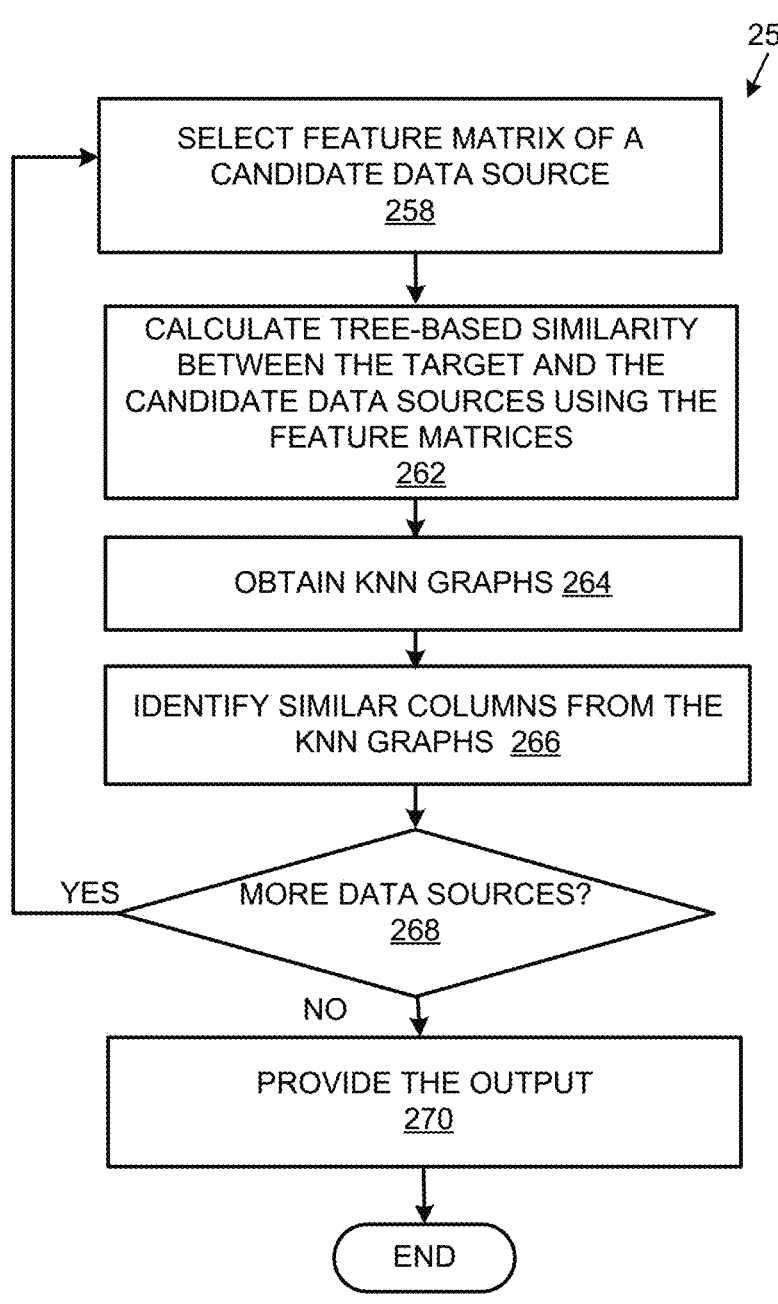
FIG. 2B includes a flowchart that shows a method of identifying similar columns for a target data source from candidate data sources in accordance with the examples disclosed herein.

FIG. 2B includes a flowchart 250 that shows a method of identifying columns that are similar to the columns in a reference/target data source from the filtered/candidate data sources identified above in accordance with some examples disclosed herein. At 258, a feature matrix of one of the candidate data sources 162 is selected for similarity matching. At 262, a tree-based similarity is calculated for the columns of the target data source 190 and the candidate data source using the corresponding feature matrices. At 264 KNN graphs are generated from the tree-based similarity calculations. The similar columns between the target data source 190 and the candidate data source are identified at 266 based on the output of the KNN graphs. At 268, it is determined if more candidate data sources remain to be processed. If yes, the method returns to block 258 to select the next candidate data source else the method moves on to block 270 to provide the output. Different types of output such as the knowledge graph 172 or the ranked list of similarity mappings can be provided at block 270. It may be appreciated that although the column analysis of data sources is shown as occurring sequentially this is only for illustration purposes and that similar columns may be identified from the candidate data sources simultaneously in parallel processing for a plurality of target data sources.

In an example, a ranked list of similarity mappings 150 can be obtained at 270. In an example, similar column mappings may be represented in the knowledge graph 172. The columns are represented as nodes and similar columns are connected by the edges of the knowledge graph 172. In an example, the distance between the nodes or the length of the edges in the knowledge graph 172 may signify the extent of column similarity so that similar columns are represented by closer nodes while columns of lower similarity are represented farther apart by edges with greater length. The knowledge graph 172 can be used by the downstream applications 180 for information extraction. Therefore, instead of accessing different data sources having various formats, different column/field names, at various remote locations, which may require data conversions, etc., the downstream applications 180 may obtain the required data from the knowledge graph 172 wherein it is uniformly represented thereby improving the ease of data access.

The ranked list of similar mappings 150 provided to the user at 270 can include a list of individual columns from different data sources that are similar to the columns of the target data source 190. A list of data sources similar to the target data source 190 may also be included in the ranked list of similar mappings along with the confidence values. In an example, the ranked list of similar mappings 150 can also include reasons why certain columns and data sources are selected by the unsupervised recommender 108 as being similar to the target data source 190. These reasons may be generated using features of explainable Artificial Intelligence (AI).

Figure 3:
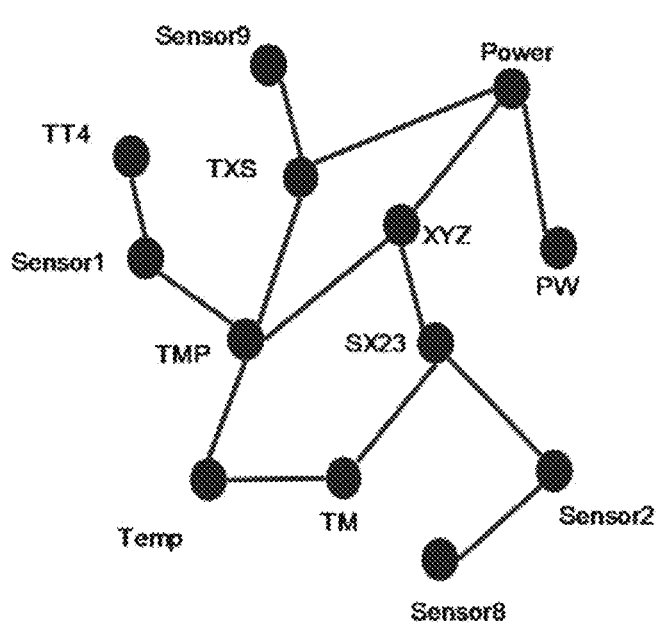
FIG. 3 shows different outputs generated in accordance with the examples disclosed herein.

FIG. 3 shows the different outputs generated in accordance with the examples disclosed herein. One of the outputs shown includes a portion 350 of a knowledge graph generated in accordance with the examples disclosed herein. The nodes in the portion 350 represent different columns and similar columns are connected via edges. Another output that is generated by the data matching and alignment system 100 may include a ranked list 360 showing similarity mappings between the columns of a target data source and the candidate data sources along with the respective similarity percentages. For example, the ranked list 360 shows that the column 'power' is similar to the columns 'PW' with 71% confidence and to the column 'XYZ' with 66% confidence. Therefore, the node representing the column 'power' is connected to the nodes representing the columns 'XYZ' and 'PW' the tree 350. Similarly, the column 'Sensor 2' is similar to the columns 'Sensor 8' and 'SX23' with 86% and 65% confidence values respectively, and the nodes corresponding to these columns are connected in the tree 350. It may be noted that while the terms 'Sensor 2' and 'Sensor 8' may be semantically similar and may be identified by simple string matching techniques. However, the terms 'Sensor 2' and 'SX23' are dissimilar so that the usage of simple string matching techniques on the column names would fail to identify these two columns as being similar. The feature matrix generation and analysis executed by the data matching and alignment system 100, therefore, enables identifying such related data with dissimilar labels spread across a data corpus by identifying similar columns for selected data sources. The table 370 includes the columns and the reasons for selecting specific columns as similar to the target columns. For example, R1, R2, R3 are the reasons for selecting 'PW' as a similar column while R1 and R5 are the reasons for selecting the column 'XYZ' as a similar column to the 'Power' column. Similarly, reasons are provided for the selection of the options OP1 and OP2 as similar columns for each of the Sensor 2, Temp, and Sensor 1 columns.

Figure 4:
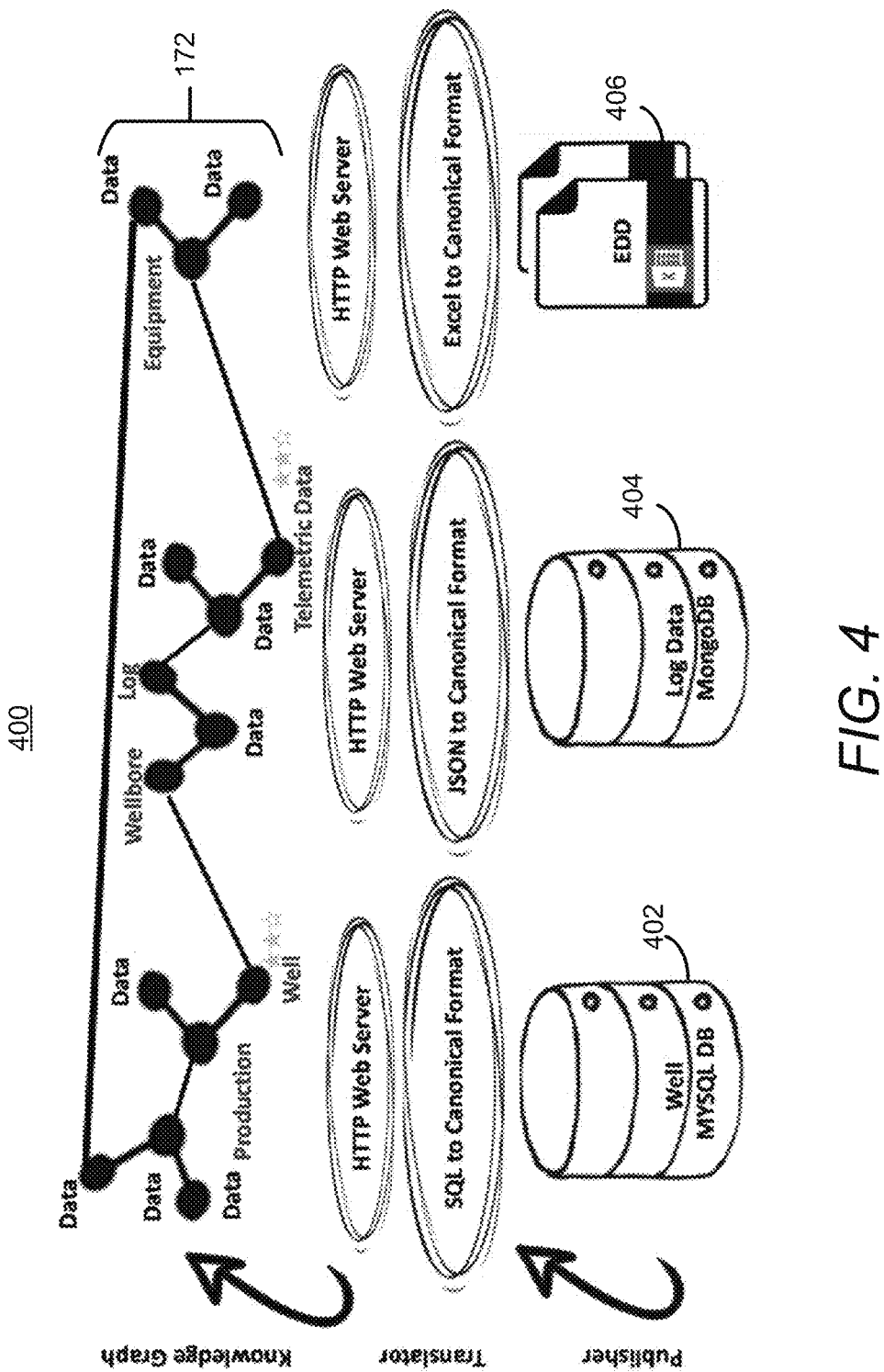
FIG. 4 shows an example of a knowledge graph-enabled data mesh architecture implemented in accordance with the examples disclosed herein.

FIG. 4 shows an example of a knowledge graph-enabled data mesh architecture 400 implemented in accordance with the examples disclosed herein. The data mesh architecture may include different data sources or data publishers 402, 404, and 406 emitting data in different formats. The data mesh architecture 400 wherein the data is published rather than pulled may also include data consumers that consume the emitted data to execute different functions. The example discussed herein pertains to the energy sector but it may be appreciated that knowledge graphs as described herein can be used to connect data across disparate data sources in various domains. The data mesh architecture 400 includes production data stored in MySQL database 402 in Structured Query Language (SQL) format, Telemetric data stored in Mongo database 404 in Javascript Notation Object (JSON) format while engineering diagram digitalizations and other equipment data are stored in Excel 406 as spreadsheets. To enable Artificial Intelligence (AI) based applications access to these various data sources, the data emitted by the data sources 402, 404, and 406 needs to be converted into some canonical format to enable data sharing. This data sharing is enabled by the knowledge graph 172 generated per the examples disclosed herein by determining the data set and column similarities between the various data sources 402, 404, and 406. The knowledge graph 172 forms a repository of structured data with all the relationships captured for data extracted from the different sources 402, 404, and 406 in different formats. The knowledge graph 172 may therefore accelerate data ingestion by positioning the data in its semantically relevant location. In an example, the data in the knowledge graph 172 may be tagged with the data quality and other types of metadata. The knowledge graph 172 enables discovering the hierarchy of dependencies and finding data with similar nature.

Figure 5:
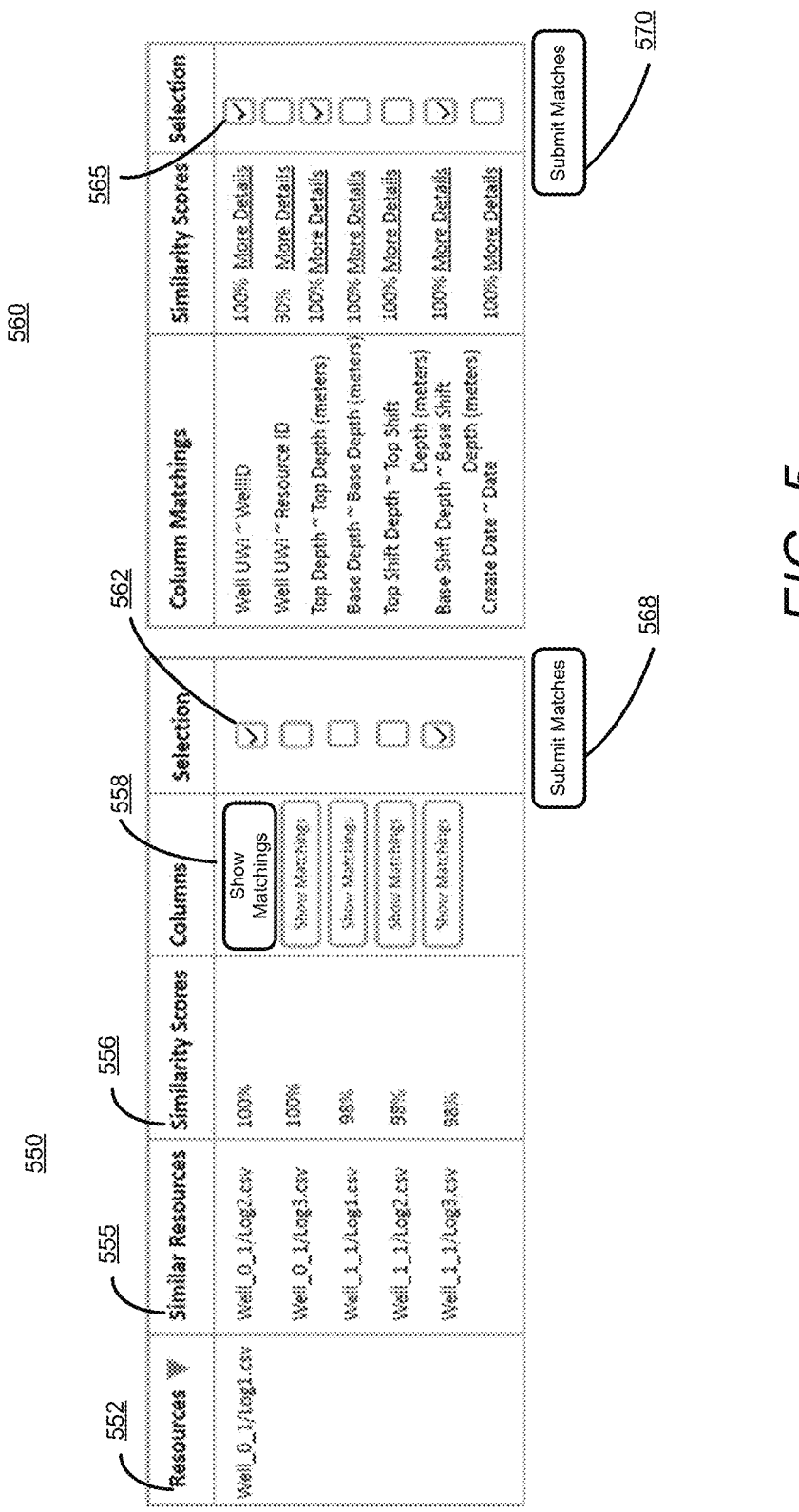
FIG. 5 shows Input/Output (U/I) User Interfaces (UIs) including a data matching table and a column matchings table generated according to some examples disclosed herein.

FIG. 5 shows Input/Output (I/O) UIs including a data matching table 550 and a column matchings table 560 providing the similarity mappings which enable generating the knowledge graph 172 according to some examples. The target data source 190 can be selected under the resources column 552. In this case, it includes a comma-separated values (.csv) file including a well measurements. The similarity mappings identified for the target data source 190 are shown under the similar resources column 555 of the data matching table 550 along with the corresponding similarity scores listed in the similarity scores column 556. The specific columns that match up from the data sources listed in the similar resources column 555 can be viewed by selecting the show matchings button 558. Clicking the show matchings button 558 opens up the column matchings table 560 which lists the matching columns from the selected data source i.e., Well_0_1/Log 2.csv. The column matchings table 560 also includes the similarity scores of the columns. Using the selection checkboxes 562, 565 from the data matching table 550 and the column matchings table 560 along with the respective submit matches buttons 568 and 570 enables the data matching and alignment system 100 to receive user input regarding specific similarity mappings to be provided for further downstream processes.

FIG. 6 shows data from an example use case that can be processed by the data matching and alignment system 100 according to some examples. The example use case pertains to the energy domain wherein tools such as Open Subsurface data Universe (OSDU) are used. OSDU includes data producers e.g., energy hardware that produces data with metadata and data consumers such as software applications using metadata. It is a hybrid centralized/decentralized platform where identity, discovery, compliance, etc., are handled centrally whereas each domain's storage, retrieval, delivery, etc. are handled in a decentralized manner. As mentioned above, siloed data such as the well production data may be stored in a MySQL database, well bore logs may be stored in a MongoDB database and engineering diagram digitalization may be stored in spreadsheet data formats. The AI-based data matching and alignment system 100 and methods enable the building the knowledge graph 172 that may act as a data catalog describing how the data products are linked with each other. It enables faster application development as the knowledge graph provides semantic relationships between data and guidance on the data hierarchy.

Tables 610 and 620 include example data of an oil and gas company having plants in the United States and Europe utilizing the same type of equipment. While the equipment components may be similar, the data each plant collects has differences due to equipment model names, settings, and regional requirements. To make data-driven decisions, an integrated master data file that can be used across the plants in both continents needs to be developed. The disclosed AI-based data matching and alignment system 100 and methods can learn domain-specific metrics to accelerate the data mapping so that like equipment can be clustered from the information encoded in the portion 350 thereby enabling experts to identify similar data sources across the plants.

Furthermore, the AI-powered schema matching and content alignment techniques can help in creating a digital twin of the energy plants to integrate product data, supply chain data, maintenance, and monitoring data. For example, the Well_0_1/Log 1 file represented by Table 610 and Well_0_1/ Log 2 file represented by Table 620 are different with different attribute labels (i.e., column names) but include related data such as the first columns Well USW and WellID which have different column names but similar well data. The relationships between the two tables can be derived by identifying the patterns and distribution of the characters that make the attributes in these files similar, the semantical and statistical features that are in common among them, and the dependencies between the files that can filter pairwise attribute comparisons as executed by the AI-based data matching and alignment system 100.

Figure 7:
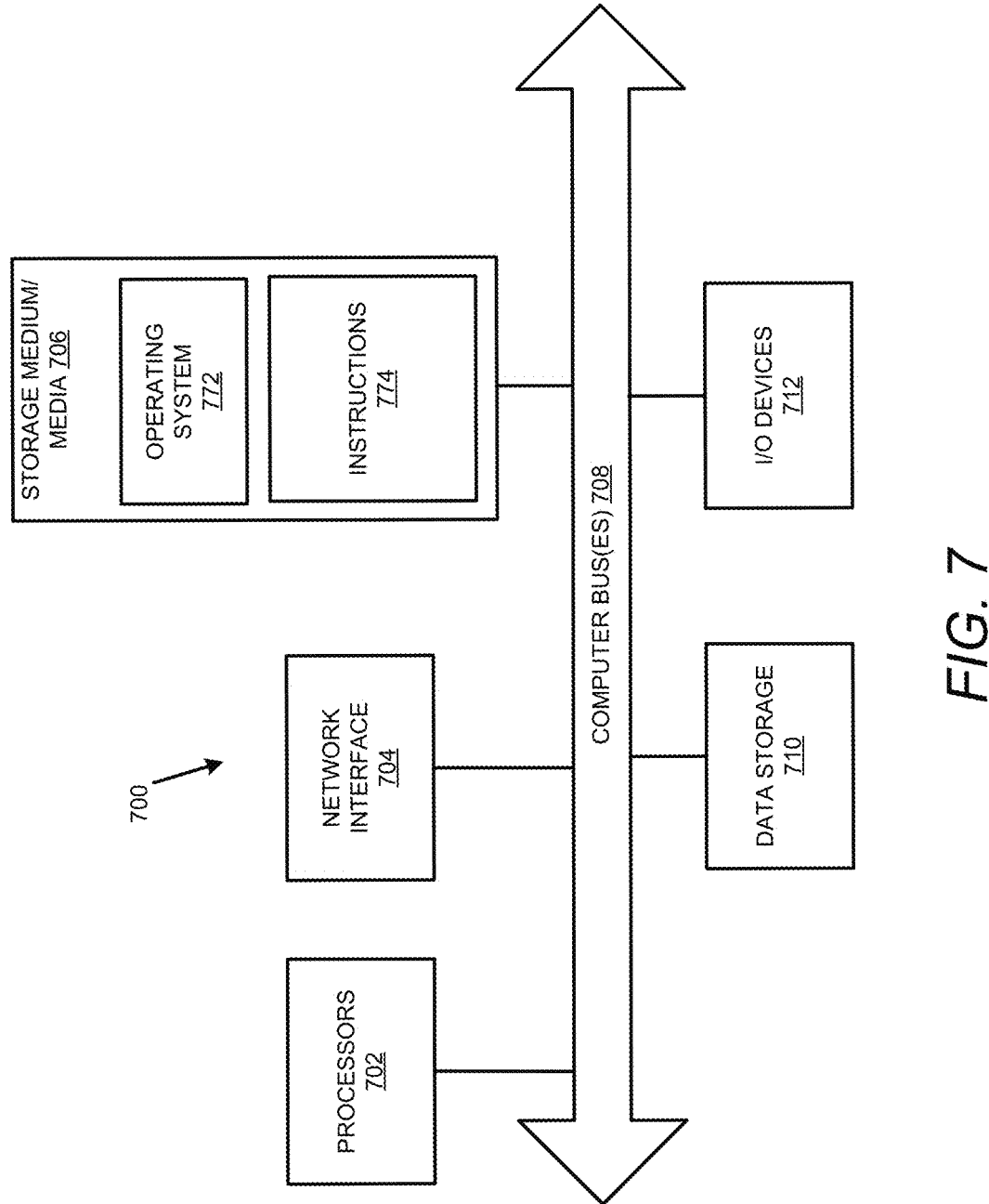
FIG. 7 illustrates a computer system that may be used to implement the AI-based data matching and alignment system according to some examples disclosed herein.

FIG. 7 illustrates a computer system 700 that may be used to implement the AI-based data matching and alignment system 100 in accordance with the examples disclosed herein. More particularly, computing machines such as desktops, laptops, smartphones, tablets, and wearables which may be used to generate or access the data from the AI-based data matching and alignment system 100 may have the structure of the computer system 700. The computer system 700 may include additional components not shown and that some of the process components described may be removed and/or modified. In another example, a computer system 700 can sit on external-cloud platforms such as Amazon Web Services, AZURE® cloud or internal corporate cloud computing clusters, or organizational computing resources, etc.

The computer system 700 includes processor(s) 702, such as a central processing unit, ASIC or another type of processing circuit, input/output devices 712, such as a display, mouse keyboard, etc., a network interface 704, such as a Local Area Network (LAN), a wireless 802.11x LAN, a 3G, 4G or 7G mobile WAN or a WiMax WAN, and a processor-readable medium 706. Each of these components may be operatively coupled to a bus 708. The processor-readable or computer-readable medium 706 may be any suitable medium that participates in providing instructions to the processor(s) 702 for execution. For example, the processor-readable medium 706 may be a non-transitory or non-volatile medium, such as a magnetic disk or solid-state non-volatile memory, or a volatile medium such as RAM. The instructions or modules stored on the processor-readable medium 706 may include machine-readable instructions 774 executed by the processor(s) 702 that cause the processor(s) 702 to perform the methods and functions of the AI-based data matching and alignment system 100.

The AI-based data matching and alignment system 100 may be implemented as software or machine-readable instructions stored on a non-transitory processor-readable medium and executed by one or more processors 702. For example, the processor-readable medium 706 may store an operating system 772, such as MAC OS, MS WINDOWS, UNIX, or LINUX, and code 774 for the AI-based data matching and alignment system 100. The operating system 772 may be multi-user, multiprocessing, multitasking, multithreading, real-time, and the like. For example, during runtime, the operating system 772 is running and the code for the AI-based data matching and alignment system 100 is executed by the processor(s) 702.

The computer system 700 may include a data storage 710, which may include non-volatile data storage. The data storage 710 stores any data used by the AI-based data matching and alignment system 100. The data storage 710 may be used as the data storage 170 to store the features, the calculated similarities, the KNN graphs, and other data elements which are generated and/or used during the operation of the AI-based data matching and alignment system 100.

The network interface 704 connects the computer system 700 to internal systems for example, via a LAN. Also, the network interface 704 may connect the computer system 700 to the Internet. For example, the computer system 700 may connect to web browsers and other external applications and systems via the network interface 704.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based data matching and alignment system, comprising:
   at least one processor;
   a non-transitory processor-readable medium storing machine-readable instructions that cause the processor to:
   receive a request for identifying similar data for a target data source from a plurality of data sources;
   generate feature matrices for the target data source and the plurality of data sources, wherein each feature matrix of the feature matrices includes respective features of the target data source and the plurality of data sources;
   identify at least one candidate data source that is similar to the target data source from the plurality of data sources, wherein the at least one candidate data source is identified based on corresponding feature matrices of the plurality of data sources and the feature matrix of the target data source, wherein the identification of the at least one candidate data source provides for preliminary filtering to select a subset of the plurality of data sources;
   identify columns of the at least one candidate data source that are similar to columns of the target data source by matching columns of the target data source with columns of the subset of the plurality of data sources and by applying tree-based similarity calculations to a feature matrix of the at least one candidate data source and the feature matrix of the target data source, wherein the similarities are determined based at least on feature matrices of the target data source and the features of the at least one candidate data sources;

enable a display of one or more of the columns of the at least one candidate data source that are similar columns to the columns of the target data source;

generate a knowledge graph that represents the similar columns of the at least one candidate data source and the target data source; and enable functioning of a downstream application to access the knowledge graph for information extraction, wherein enabling the downstream application to access the knowledge graph comprising:

obtaining output that includes at least one of:

a portion of the knowledge graph, the knowledge graph representing the columns as nodes, wherein the similar columns are connected by edges of the knowledge graph, and a distance between the nodes signifies a column similarity; and a ranked list of similarity mappings between the columns of the target data source and the candidate data sources along with respective similarity percentages for the similarity mappings; and executing the functions of the downstream application based on the obtained output.

2. The data matching and alignment system of claim 1, wherein the features include character level features, semantic level features, and data dependency features.

3. The data matching and alignment system of claim 1, wherein the character level features include at least column data type features and character distribution features.

4. The data matching and alignment system of claim 1, wherein the semantic level features include at least semantic text features and numeric distribution comparison features.

5. The data matching and alignment system of claim 1, wherein to identify the at least one candidate data source similar to the target data source, the processor is to:

generate a K Nearest Neighbor (KNN) graph on implementing a distance metric to the corresponding feature matrices of the plurality of data sources and the feature matrix of the target data source.

6. The data matching and alignment system of claim 5, wherein the distance metric includes Mahanalobis distance.

7. The data matching and alignment system of claim 1, wherein to identify the at least one candidate data source similar to the target data source, the processor is to:

select nearest N neighbors from the KNN graph as a plurality of candidate data sources, wherein N is a natural number and the at least one candidate data source includes the plurality of candidate data sources.

8. The data matching and alignment system of claim 1, wherein to identify the columns of the at least one candidate data source that are similar to the columns of the target data source, the processor is to:

generate K Nearest Neighbor (KNN) graphs from the tree-based similarity calculations; and identify the columns of the at least one candidate data source that are similar to the columns of the target data source from the KNN graphs.

9. A method of generating similarity mappings between data sources comprising:

receiving a request for identifying matching data for a target data source of a plurality of data sources from a data corpus;

extracting column features of the target data source and the plurality of data sources, wherein the column features are stored as corresponding feature matrices;

identifying one or more candidate data sources from the plurality of data sources that are similar to the target data source, wherein the candidate data sources are identified based on a distance measure obtained for the feature matrix of the target data source and the corresponding feature matrices of the plurality of data sources, wherein the identification of the one or more candidate data source provides for preliminary filtering to select a subset of the plurality of data sources;

identifying columns of the one or more candidate data sources that are similar to columns of the target data source by matching columns of the target data source with columns of the subset of the plurality of data sources and by applying tree-based similarity calculations to a feature matrix of the one or more candidate data source and the feature matrix of the target data source, wherein the similarities between the columns are determined based at least on feature matrices of the target data source and the features of one of the one or more candidate data sources;

generating a knowledge graph representing the similarities of the columns of the one or more candidate data sources and the columns of the target data source; and enabling functioning of a downstream application by enabling the downstream application to access the knowledge graph, wherein enabling the downstream application to access the knowledge graph comprising:

obtaining output that includes at least one of:

a portion of the knowledge graph, the knowledge graph representing the columns as nodes, wherein the similar columns are connected by edges of the knowledge graph, and a distance between the nodes signifies a column similarity; and a ranked list of similarity mappings between the columns of the target data source and the candidate data sources along with respective similarity percentages for the similarity mappings; and executing the functions of the downstream application based on the obtained output.

10. The method of claim 9, further comprising:

providing a display of the columns of the one or more candidate data sources that are similar to the columns of the target data source.

11. The method of claim 10, further comprising:

providing via the display, a percentage of similarity between each of the similar columns of the one or more candidate data sources and the columns of the target data source.

12. The method of claim 10, further comprising:

receiving user input selecting one or more of the similar columns for generating the knowledge graph, wherein the user input is received via the display.

13. The method of claim 9, wherein the column features include at least character level features, semantic level features, and dependency level features.

14. The method of claim 13, further comprising:

generating the feature matrices for the plurality of data sources including the target data source, by stacking the character level features, semantic level features, and dependency level features of each of the columns adjacent to each other.

15. The method of claim 9, further comprising:

outputting reasons for identifying the columns of the one or more candidate data sources as being similar to the columns of the target data source.

16. A non-transitory processor-readable storage medium comprising machine-readable instructions that cause a processor to:

receiving a request for identifying matching data for a target data source of a plurality of data sources from a data corpus;

extracting column features of the target data source and the plurality of data sources, wherein the column features are stored as corresponding feature matrices;

identifying one or more candidate data sources from the plurality of data sources that are similar to the target data source, wherein the candidate data sources are identified based on a distance measure obtained for the feature matrix of the target data source and the corresponding feature matrices of the plurality of data sources, wherein the identification of the one or more candidate data source provides for preliminary filtering to select a subset of the plurality of data sources;

identifying columns of the one or more candidate data sources that are similar to columns of the target data source by matching columns of the target data source with columns of the subset of the plurality of data sources and by applying tree-based similarity calculations to a feature matrix of the one or more candidate data source and the feature matrix of the target data source, wherein the similarities between the columns are determined based at least on feature matrices of the target data source and the one or more candidate data sources;

generating a knowledge graph representing the similarities of the columns of the one or more candidate data sources and the columns of the target data source; and enabling functioning of a downstream application by enabling the downstream application to access the knowledge graph, wherein enabling the downstream application to access the knowledge graph comprising:

obtaining output that includes at least one of:

a portion of the knowledge graph, the knowledge graph representing the columns as nodes, wherein the similar columns are connected by edges of the knowledge graph, and a distance between the nodes signifies a column similarity; and a ranked list of similarity mappings between the columns of a target data source and the candidate data sources along with respective similarity percentages for the similarity mappings; and executing the functions of the downstream application based on the obtained output.

17. The non-transitory processor-readable storage medium of claim 16, wherein the instructions to identify the at least one candidate data source as similar to the target data source, further cause the processor to:

apply K Nearest Neighbor (KNN) methodology on implementing the distance measure to the corresponding feature matrices of the plurality of data sources and the feature matrix of the target data source.

* * * * *